US007582690B2

(12) United States Patent
Pearson et al.

(10) Patent No.: US 7,582,690 B2
(45) Date of Patent: Sep. 1, 2009

(54) STABILIZED ALIPHATIC POLYESTER COMPOSITIONS

(75) Inventors: Jason Clay Pearson, Kingsport, TN (US); Gether Irick, Jr., Gray, TN (US)

(73) Assignee: Eastman Chemical Company, Kingsport, TN (US)

( * ) Notice: Subject to any disclaimer, the term of this patent is extended or adjusted under 35 U.S.C. 154(b) by 485 days.

(21) Appl. No.: 11/171,772

(22) Filed: Jun. 30, 2005

(65) Prior Publication Data

US 2006/0111481 A1 May 25, 2006

Related U.S. Application Data

(60) Provisional application No. 60/629,358, filed on Nov. 19, 2004.

(51) Int. Cl.
*C08K 5/3492* (2006.01)
*C08K 5/51* (2006.01)

(52) U.S. Cl. .................................... 524/100; 524/129

(58) Field of Classification Search ................ 524/100, 524/129
See application file for complete search history.

(56) References Cited

U.S. PATENT DOCUMENTS

| | | | |
|---|---|---|---|
| 3,589,956 A | 6/1971 | Kranz et al. | |
| 4,025,492 A | 5/1977 | Binsack et al. | |
| 4,136,089 A | 1/1979 | Bier et al. | |
| 4,176,224 A | 11/1979 | Bier et al. | |
| 4,208,527 A | 6/1980 | Horlbeck et al. | |
| 4,238,593 A | 12/1980 | Duh | |
| 4,427,614 A | 1/1984 | Barham et al. | |
| 4,524,165 A | 6/1985 | Musser et al. | |
| 4,525,504 A | 6/1985 | Morris et al. | |
| 4,619,956 A | 10/1986 | Susi | |
| 4,740,542 A | 4/1988 | Susi | |
| 4,880,592 A | 11/1989 | Martini et al. | |
| 4,889,882 A | 12/1989 | Nelson et al. | |
| 5,714,530 A | 2/1998 | Waterman | |
| 6,051,164 A * | 4/2000 | Samuels ..................... 252/404 |
| 6,136,441 A | 10/2000 | MacGregor et al. | |
| 2002/0008700 A1 | 1/2002 | Fuki | |
| 2002/0103279 A1 | 8/2002 | Sargeant et al. | |
| 2004/0180997 A1 | 9/2004 | Pearson et al. | |

FOREIGN PATENT DOCUMENTS

| | | |
|---|---|---|
| EP | 0365481 | 4/1990 |
| EP | 0675159 | 10/1995 |
| EP | 0953595 | 11/1999 |
| EP | 1302309 A2 | 4/2003 |
| WO | WO 00/24820 | 5/2000 |
| WO | WO 00/63282 | 10/2000 |
| WO | WO 01/79340 | 10/2001 |
| WO | WO 2005/061580 A1 | 7/2005 |

OTHER PUBLICATIONS

Zweifel, Plastic Additives Handbook, 5th Edition, Hanser Gardner Publications, Inc., Cincinnati, OH, 2001, pp. 98-108 and pp. 109-112.
Wilfong, Linear Polyesters, Journal of Polymer Science, 1961, pp. 385-410, vol. 54.
Berger-Schunn, a Primer for the Beginner A Reminder for the Expert, Practical Color Measurement, 1994, pp. 39-56 and 91-98, Wiley, NY.

* cited by examiner

*Primary Examiner*—Kriellion A Sanders
(74) *Attorney, Agent, or Firm*—Louis N. Moreno; Bernard J. Graves, Jr.

(57) ABSTRACT

Disclosed are stabilized aliphatic polyester compositions comprising an aliphatic polyester, a HALS, and a tris-aryl-S-triazine UV absorber that show low embrittlement, haze formation, and discoloration during weathering. Also disclosed are aliphatic polyester compositions comprising aliphatic polyester, a hindered amine light stabilizer, a triazine UV absorber, and a phosphite that exhibit low color prior to weathering but retain good clarity, color, and excellent impact strength after exposure to weathering conditions. The aliphatic polyester compositions may be used prepare shaped articles such as, for example, films, sheets, bottles, tubes, profiles, fibers, and molded articles.

15 Claims, No Drawings

STABILIZED ALIPHATIC POLYESTER COMPOSITIONS

CROSS REFERENCES TO RELATED APPLICATIONS

This application claims the benefit of U.S. Provisional Application Ser. No. 60/629,358 filed Nov. 19, 2004.

FIELD OF THE INVENTION

The present invention pertains generally to stabilized aliphatic polyester compositions containing certain combinations of hindered amine light stabilizers and UV absorbers. More particularly, the present invention pertains to aliphatic polyester compositions comprising an aliphatic polyester, a hindered amine light stabilizer, and a triazine UV absorber that exhibits high clarity and shows excellent weatherability. The invention also pertains to aliphatic polyester compositions comprising aliphatic polyester, a hindered amine light stabilizer, a triazine UV absorber, and a phosphite that exhibit low color prior to weathering.

BACKGROUND OF THE INVENTION

UV light absorbers and hindered amine light stabilizers, abbreviated herein as "HALS" are known to be effective stabilizers for polyolefins. In addition to polyolefins, HALS have been used to improve the weatherability of polyesters that contain aromatic repeating units such as, for example, linear polyalkylene terephthalates, copolyester elastomers, polycarbonates and mixtures of these polymers. Weatherable, aliphatic copolyesterether compositions comprising a combination of HALS, UV absorbers, phosphites, and hindered phenol antioxidants also are known.

Certain UV absorbers, when used alone and in combination with HALS, often do not effectively control and can cause an increase in the haze, color, and brittleness of aliphatic polyesters under weathering conditions. In addition, certain combinations of HALS and UV absorbers often are not compatible with aliphatic polyesters and can cause haze and color to appear in the polyester before the polymer is exposed to weathering conditions. Phosphites are sometimes added to control color, but the combination of certain HALS and phosphites also can produce haze. Thus, there is a need within the art for a stabilized polyester composition that will withstand the effects of weathering. There is a also need for a stabilized aliphatic polyester composition having a combination of UV absorbers and HALS that will not show a high level of color or haze before exposure to weathering conditions. Such stabilized aliphatic polyester compositions would have commercial applications in areas where aliphatic polyesters are exposed to sunlight and to the outside environment such as, for example, in signage, packaging, computer touch-pads, and metal laminates.

DESCRIPTION OF THE INVENTION

It has been discovered that a combination of thermoplastic aliphatic polyesters with certain HALS and UV absorbers provides a stabilized aliphatic polyester composition that shows low embrittlement, haze formation, and discoloration during weathering. Thus, the present invention provides a stabilized, aliphatic polyester composition, comprising:

(A) at least one aliphatic, thermoplastic polyester comprising residues of at least one substituted or unsubstituted, linear or branched, dicarboxylic acid selected from aliphatic dicarboxylic acids containing 2 to 18 carbon atoms and cycloaliphatic dicarboxylic acids containing 5 to 10 carbon atoms; and residues of at least one, substituted or unsubstituted, linear or branched, diol containing 2 to 18 carbon atoms selected from aliphatic diols, polyalkylene ether glycols, and cycloaliphatic diols;
(B) at least one hindered amine light stabilizer; and
(C) at least one tris-aryl-S-triazine UV-absorber.

Our composition shows low haze, color, and excellent impact strength after exposure to weathering conditions. The aliphatic polyester can comprise residues of both substituted or unsubstituted, linear or branched, aliphatic and cycloaliphatic dicarboxylic acids and diols. For example, in one embodiment, the aliphatic polyester can comprise about 80 to 100 mole percent, based on the total moles of dicarboxylic acid residues, of the residues of 1,4-cyclohexanedicarboxylic acid; 1,3-cyclohexanedicarboxylic acid, or a mixture thereof; and about 10 to 100 mole percent, based on the total moles of diol residues, of the residues of 1,4-cyclohexanedimethanol; ethylene glycol; diethylene glycol; 1,3-cyclohexanedimethanol; 1,4-butanediol; 2,2,4,4-tetramethyl-1,3-cyclobutanediol, or mixtures thereof.

Our novel composition also includes one or more hindered amine light stabilizers selected from one or more compounds having formulas (1-4):

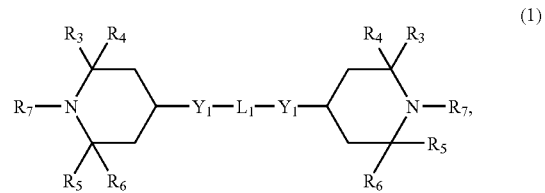

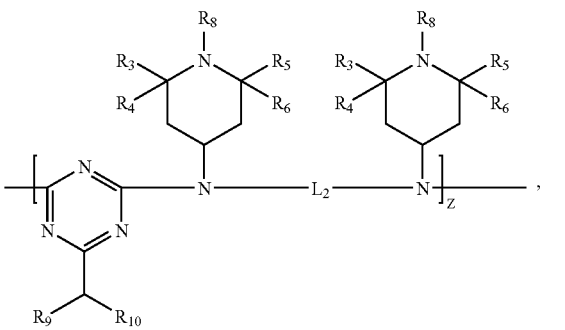

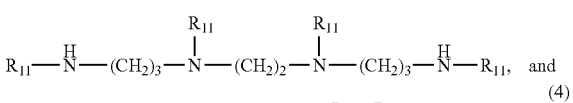

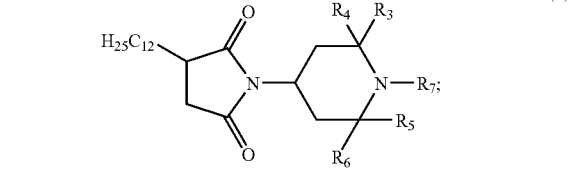

wherein
$R_3$, $R_4$, $R_5$ and $R_6$ are $C_1$-$C_{22}$ alkyl;
$R_7$ and $R_8$ are independently selected from hydrogen, $C_1$-$C_{22}$ alkyl, and $C_1$-$C_{22}$ alkoxy;
$Y_1$ is —O—;
$L_1$ is the divalent linking group —C(O)-$L_2$-C(O)—;

$L_2$ is $C_1$-$C_{22}$ alkylene;

$R_9$ and $R_{10}$ are independently selected from hydrogen, $C_1$-$C_{22}$ alkyl, $C_3$-$C_8$ cycloalkyl, and substituted $C_3$-$C_8$ cycloalkyl, or $R_9$ and $R_{10}$ collectively may represent a divalent group forming a morpholine and/or a piperidine ring;

Z is a positive integer of up to 20;

$R_{11}$ is selected from hydrogen, $C_1$-$C_{22}$ alkyl, substituted $C_1$-$C_{22}$ alkyl, and radical A, wherein radical A has the following structure:

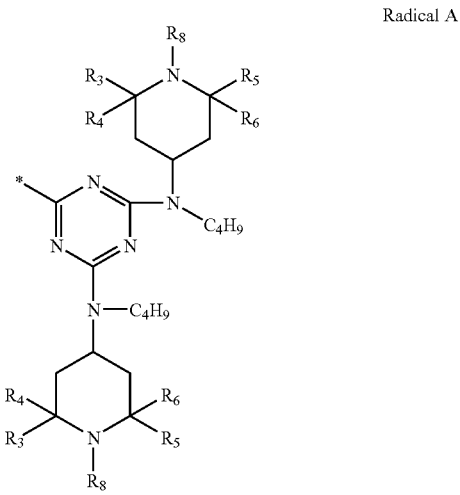

Radical A wherein * designates the position of attachment.

The aliphatic polyester composition of the invention also comprises at least one tris-aryl-S-triazine having the following formula:

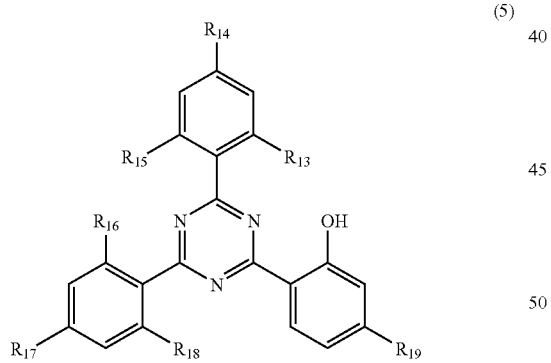

(5)

wherein $R_{13}$, $R_{14}$, $R_{15}$, $R_{16}$, $R_{17}$, and $R_{18}$ are independently selected from hydrogen, $C_1$-$C_{22}$ alkyl, substituted $C_1$-$C_{22}$ alkyl, $C_3$-$C_8$ cycloalkyl, and substituted $C_3$-$C_8$ cycloalkyl; and $R_{19}$ is selected from hydrogen, $C_1$-$C_{22}$ alkyl, substituted $C_1$-$C_{22}$ alkyl, $C_3$-$C_8$ cycloalkyl, substituted $C_3$-$C_8$ cycloalkyl and —$OR_{20}$, wherein $R_{20}$ is selected from hydrogen, $C_1$-$C_{22}$ alkyl, substituted $C_1$-$C_{22}$ alkyl, $C_3$-$C_8$ cycloalkyl, substituted $C_3$-$C_8$ cycloalkyl, aryl, and heteroaryl.

It also has been found unexpectedly that the presence of certain phosphites, in combination with triazine UV absorbers and HALS, provides a stabilized, aliphatic polyester composition that exhibits high clarity and low color before to exposure to weathering conditions. Thus, another aspect of the instant invention is a stabilized, aliphatic polyester composition, comprising:

(A) at least one aliphatic, thermoplastic polyester comprising residues of at least one substituted or unsubstituted, linear or branched, dicarboxylic acid selected from aliphatic dicarboxylic acids containing 2 to 18 carbon atoms and cycloaliphatic dicarboxylic acids containing 5 to 10 carbon atoms; and residues of at least one, substituted or unsubstituted, linear or branched, diol containing 2 to 18 carbon atoms selected from aliphatic diols, polyalkylene ether glycols, and cycloaliphatic diols;

(B) at least one hindered amine light stabilizer selected from one or more compounds having formulas (1) and (3):

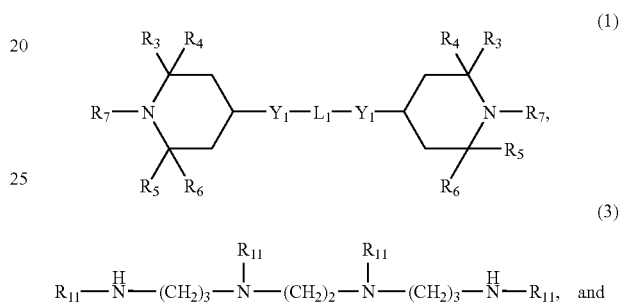

wherein $R_3$, $R_4$, $R_5$ and $R_6$ are $C_1$-$C_{22}$ alkyl;

$R_7$ and $R_8$ are independently selected from hydrogen, $C_1$-$C_{22}$ alkyl, and $C_1$-$C_{22}$ alkoxy;

$Y_1$ is —O—;

$L_1$ is the divalent linking group —C(O)-$L_2$-C(O)—;

$L_2$ is $C_1$-$C_{22}$ alkylene; and $R_{11}$ is selected from hydrogen, $C_1$-$C_{22}$ alkyl, substituted $C_1$-$C_{22}$ alkyl, and radical A, wherein radical A has the following structure:

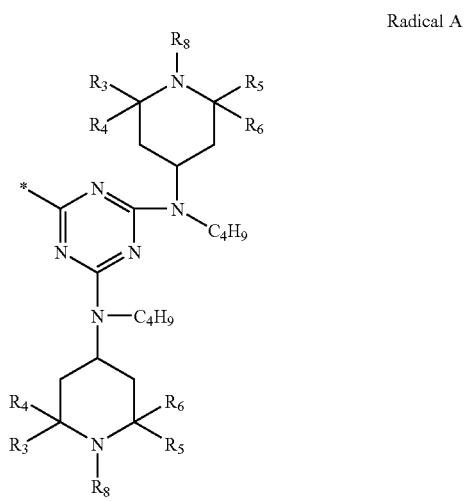

Radical A wherein * designates the position of attachment;

(C) at least one tris-aryl-S-triazine UV-absorber; and (D) at least one pentaerythritol diphosphite.

The presence of the diphosphite reduces the initial haze and color that can be formed from the combination of the HALS and the triazine UV absorber. For example, in addition to the UV absorber and HALS described above, the composition may comprise about 0.1 to about 2 weight percent of a pentaerythritol diphosphite comprising at least one compound having formula (6):

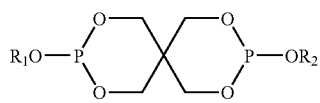

wherein
$R_1$ and $R_2$ are independently selected from substituted and unsubstituted $C_1$-$C_{22}$ alkyl, $C_3$-$C_8$ cycloalkyl, and, aryl.

DETAILED DESCRIPTION

A combination of thermoplastic aliphatic polyesters with certain HALS and triazine UV absorbers provides a stabilized polyester composition that shows low embrittlement, haze formation, and discoloration during weathering. In a general embodiment, therefore, the present invention provides a stabilized, aliphatic polyester composition, comprising:
(A) at least one aliphatic, thermoplastic polyester comprising residues of at least one substituted or unsubstituted, linear or branched, dicarboxylic acid selected from aliphatic dicarboxylic acids containing 2 to 18 carbon atoms and cycloaliphatic dicarboxylic acids containing 5 to 10 carbon atoms; and residues of at least one, substituted or unsubstituted, linear or branched, diol containing 2 to 18 carbon atoms selected from aliphatic diols, polyalkylene ether glycols, and cycloaliphatic diols;
(B) at least one hindered amine light stabilizer; and
(C) at least one tris-aryl-S-triazine UV-absorber.

In addition, it has been found unexpectedly, that the presence of dipentaerythritol phosphites, in combination with certain HALS, avoids the formation of excessive haze and color that can develop before any exposure to weathering conditions. Thus, in one aspect, the invention provides aliphatic polyester compositions that initially exhibit low haze, good color, and high clarity prior to weathering and show low embrittlement, haze formation, and discoloration upon exposure to weathering conditions. In addition to the aliphatic polyester, HALS, UV absorber, and phosphite, our novel composition, optionally, may further comprise one or more additives known to one skilled in the art such as, for example, antioxidants; organic or inorganic colorants or white pigments such as $TiO_2$, ZnO and baryta; recycled polymer; impact modifiers; plasticizers; halogenated flame-retardants; fillers; nonhalogenated flame-retardants; and processing aids.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. As used in the specification and the appended claims, the singular forms "a," "an" and "the" include their plural referents unless the context clearly dictates otherwise. For example, reference a "polymer," or a "shaped article," is intended to include the processing or making of a plurality of polymers, or articles. References to a composition containing or including "an" ingredient or "a" polymer is intended to include other ingredients or other polymers, respectively, in addition to the one named.

By "comprising" or "containing" or "including" we mean that at least the named compound, element, particle, or method step, etc., is present in the composition or article or method, but does not exclude the presence of other compounds, catalysts, materials, particles, method steps, etc, even if the other such compounds, material, particles, method steps, etc., have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps or ingredients is a convenient means for identifying discrete activities or ingredients and the recited lettering can be arranged in any sequence, unless otherwise indicated.

The term "$C_1$-$C_{22}$ alkyl" denotes a saturated hydrocarbon radical which contains one to twenty-two carbons and which may be straight or branched-chain. Such $C_1$-$C_{22}$ alkyl groups can be, for example, methyl, ethyl, propyl, butyl, pentyl, hexyl, heptyl, octyl, isopropyl, isobutyl, tertbutyl, neopentyl, 2-ethylheptyl, 2-ethylhexyl, and the like. The term "substituted $C_1$-$C_{22}$ alkyl" refers to $C_1$-$C_{22}$ alkyl radicals as described above which may be substituted with one or more substituents selected from hydroxy, halogen, cyano, aryl, heteroaryl, $C_3$-$C_8$-cycloalkyl, substituted $C_3$-$C_8$ cycloalkyl, $C_1$-$C_6$ alkoxy, $C_2$-$C_6$ alkanoyloxy and the like.

The term "$C_3$-$C_8$ cycloalkyl" is used to denote a cycloaliphatic hydrocarbon radical containing three to eight carbon atoms. The term "substituted $C_3$-$C_8$ cycloalkyl" is used to describe a $C_3$-$C_8$ cycloalkyl radical as detailed above containing at least one group selected from $C_1$-$C_6$ alkyl, $C_1$-$C_6$ alkoxy, hydroxy, halogen, and the like.

The term "aryl" is used to denote an aromatic radical containing 6, 10 or 14 carbon atoms in the conjugated aromatic ring structure and these radicals substituted with one or more groups selected from $C_1$-$C_6$ alkyl; $C_1$-$C_6$ alkoxy; phenyl, and phenyl substituted with $C_1$-$C_6$ alkyl; $C_1$-$C_6$ alkoxy; halogen and the like; $C_3$-$C_8$ cycloalkyl; halogen; hydroxy, cyano, trifluoromethyl and the like. Typical aryl groups include phenyl, naphthyl, phenylnaphthyl, anthryl (anthracenyl) and the like.

The term "heteroaryl" is used to describe conjugated cyclic radicals containing at least one hetero atom selected from sulfur, oxygen, nitrogen or a combination of these in combination with from two to about ten carbon atoms and these heteroaryl radicals substituted with the groups mentioned above as possible substituents on the aryl radical. Typical heteroaryl radicals include: 2- and 3-furyl, 2- and 3-thienyl, 2- and 3-pyrrolyl, 2-, 3-, and 4-pyridyl, benzothiophen-2-yl; benzothiazol-2-yl, benzoxazol-2-yl, benzimidazol-2-yl, 1, 3, 4-oxadiazol-2-yl, 1, 3, 4-thiadiazol-2-yl, 1,2,4-thiadiazol-5-yl, isothiazol-5-yl, imidazol-2-yl, quinolyl and the like.

The terms "$C_1$-$C_6$ alkoxy" is used to represent the groups —O—$C_1$-$C_6$ alkyl, wherein "$C_1$-$C_6$ alkyl" denotes a saturated hydrocarbon that contains 1-6 carbon atoms, which may be straight or branched-chain, and which may be further substituted with one or more groups selected from halogen, methoxy, ethoxy, phenyl, hydroxy, acetyloxy and propionyloxy. The term "halogen" is used to represent fluorine, chlorine, bromine, and iodine; however, chlorine and bromine are preferred.

The term "polyester", as used herein, is intended to include both "homopolyesters" and "copolyesters" and is understood to mean a synthetic polymer prepared by the polycondensation of one or more difunctional carboxylic acids with one or more difunctional hydroxyl compounds. The term "copolyester", as used herein, is understood to mean a polyester polymer which contains two or more dissimilar acid and/or hydroxyl monomer residues. Typically, the difunctional carboxylic acid is a dicarboxylic acid or hydroxycarboxylic acid, and the difunctional hydroxyl compound is a dihydric alcohol such as, for example, glycols and diols. Alternatively, the polyesters of the invention can be prepared from hydroxycarboxylic acids or formed via a ring opening reaction of cyclic lactones; for example, as in polylactic acid prepared from its cyclic lactide or polycaprolactone formed from caprolactone.

The term "aliphatic polyester", as used herein, means a polyester comprising residues from aliphatic dicarboxylic acids, cycloaliphatic dicarboxylic acids, aliphatic diols, cycloaliphatic diols, or a mixture thereof. The term "aliphatic", as used herein with respect to the dicarboxylic acid, diol, and hydroxycarboxylic acid monomers of the present invention is intended to include both aliphatic and cycloaliphatic structures such as, for example, diols diacids, and hydroxycarboxylic acids, which contain as a backbone a straight or branched chain or cyclic arrangement of the constituent carbon atoms which may be saturated or paraffinic in nature, unsaturated, i.e., containing non-aromatic carbon-carbon double bonds, or acetylenic, i.e., containing carbon-carbon triple bonds. Thus, in the context of the description and the claims of the present invention, aliphatic is intended to include linear and branched, chain structures and cyclic structures (also referred to herein as "alicyclic" or "cycloaliphatic"). In the present invention, the difunctional carboxylic acid may be a straight chain, branched chain, or cycloaliphatic dicarboxylic acid such as, for example, 1,4-cyclohexanedicarboxylic acid; a hydroxycarboxylic acid such as, for example, lactic acid. The difunctional hydroxyl compound may be cycloaliphatic diol such as, for example, 1,4-cyclohexanedimethanol, a linear or branched aliphatic diol such as, for example, 1,4-butanediol or 2,2-dimethyl-1, 3-propanediol.

In one embodiment of the present invention, the difunctional carboxylic acid can be a cycloaliphatic dicarboxylic acid such as, for example, 1,4-cyclohexanedicarboxylic acid, and the difunctional hydroxyl compound can be an aliphatic or cycloaliphatic diol such as, for example, ethylene glycol or 1,4-cyclohexanedimethanol. The term "residue", as used herein, means any organic structure incorporated into a polymer through a polycondensation reaction involving the corresponding monomer. The term "repeating unit", as used herein, means an organic structure having a dicarboxylic acid residue and a diol residue bonded through a carbonyloxy group. Thus, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The aliphatic polyesters used in the present invention typically are prepared from dicarboxylic acids and diols which react in substantially equal proportions and are incorporated into the polyester polymer as their corresponding residues. The aliphatic polyesters of the present invention, therefore, contain substantially equal molar proportions of acid residues (100 mole %) and diol residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 30 mole % 1,4-cyclohexane dicarboxylic acid (1,4-CHDA), based on the total acid residues, means that the polyester contains 30 mole % 1,4-CHDA residues out of a total of 100 mole % acid residues. Thus, there are 30 moles of 1,4-CHDA residues among every 100 moles of acid residues. In another example, a polyester containing 30 mole % 1,4-cyclohexanedimethanol (1,4-CHDM), based on the total diol residues, means that the polyester contains 30 mole % 1,4-CHDM residues out of a total of 100 mole % diol residues. Thus, there are 30 moles of 1,4-CHDM residues among every 100 moles of diol residues.

The aliphatic polyesters referred to herein include linear, thermoplastic, crystalline or amorphous polyesters produced by conventional polymerization techniques from one or more aliphatic diols and one or more aliphatic dicarboxylic acids. The polyesters normally are molding or fiber grade and typically have an inherent viscosity of about 0.5 to about 1.2 dL/g or, more typically, about 0.55 to about 0.85 dL/g. The inherent viscosity, abbreviated herein as "I.V.", refers to inherent viscosity determinations made at 25° C. using 0.25 gram of polymer per 50 mL of a solvent composed of 60 weight percent phenol and 40 weight percent tetrachloroethane. Other examples of I.V. values which may be exhibited by the aliphatic polyesters of the invention are about 0.55 to about 0.70 dL/g, about 0.55 to about 0.65 dL/g, and about 0.60 to about 0.65 dL/g.

The composition of the present invention comprises a thermoplastic, aliphatic polyester. The aliphatic polyester may be a linear, random polyester or a branched and/or chain extended polyester comprising the residues of one or more substituted or unsubstituted, linear or branched, dicarboxylic acids selected from aliphatic dicarboxylic acids containing 2 to 18 carbon atoms and cycloaliphatic dicarboxylic acids containing 5 to 10 carbon atoms. Non-limiting examples of aliphatic and cycloaliphatic dicarboxylic acids include malonic, succinic, glutaric, adipic, pimelic, azelaic, sebacic, fumaric, 2,2-dimethyl glutaric, suberic, 1,3-cyclopentanedicarboxylic, 2,6-decahydronaphthalenedicarboxylic, 1,4-cyclohexanedicarboxylic, 1,12-dodecanedioic acid, 1,3-cyclohexanedicarboxylic, diglycolic, itaconic, maleic, 2,5-norbornanedicarboxylic, and mixtures thereof. For example, the aliphatic polyester may comprise diacid residues of one or more aliphatic dicarboxylic acids selected from glutaric acid, diglycolic acid, succinic acid, 1,4-cyclohexanedicarboxylic acid, and adipic acid. In another embodiment, the aliphatic polyester may comprise the residues of one or more diacids selected from 2,6-decahydronaphthalenedicarboxylic, 1,4-cyclohexanedicarboxylic, 1,3-cyclohexanedicarboxylic, 2,5-norbornanedicarboxylic. In yet another example, the aliphatic polyester may comprise the residues of 1,4-cyclohexanedicarboxylic acid.

The aliphatic polyester also may comprise diol residues which contain the residues of one or more substituted or unsubstituted, linear or branched, diols containing containing 2 to 18 carbon atoms selected from aliphatic diols, polyalkylene ether glycols, and cycloaliphatic diols. The substituted diols, typically, will contain 1 to about 4 substituents independently selected from halo and $C_1$-$C_4$ alkoxy. Examples of diols which may be used include, but are not limited to, ethylene glycol, diethylene glycol, 1,3-propanediol, 2,2-dimethyl-1,3-propanediol, 1,3-butanediol, 1,4-butanediol, 1,5-pentanediol, 1,6-hexanediol, poly(ethylene glycol), diethylene glycol, 2,2,4-trimethyl-1,6-hexanediol, thiodiethanol, 1,3-cyclohexanedimethanol, 1,4-cyclohexanedimethanol, 2,6-decahydronaphthalenedimethanol, 2,2,4,4-tetramethyl-1,3-cyclobutanediol, triethylene glycol, tetraethylene glycol, poly(propylene glycol), 1,4:3,6-dianhydrosorbitol, and 4,4'-isopropylidenedicyclohexanol. Cycloaliphatic diols can be employed as their cis or trans isomers or as mixtures of both forms. For example, in one embodiment, the aliphatic polyester may comprise the residues of at least one diol selected from 1,4-butanediol; 1,3-propanediol; ethylene glycol; 1,6-hexanediol; diethylene glycol; 1,3-cyclohexanedimethanol; 1,4-cyclohexanedimethanol; 2,6-decahydronaphthalene-dimethanol; and 2,2,4,4-tetramethyl-1,3-cyclobutanediol. In another example, the aliphatic polyester can comprise about 95 to 100 mole percent, based on the total moles of dicarboxylic acid residues, of the residues of 1,4-cyclohexanedicarboxylic acid; and about 95 to 100 mole percent, based on the total moles of diol residues, of the residues of 1,4-cyclohexanedimethanol.

Additional examples of aliphatic polyesters of the invention include polyesters having diacid residues comprising about 80 to 100 mole percent, based on the total moles of dicarboxylic acid residues, of the residues of 1,4-cyclohexanedicarboxylic acid; 1,3-cyclohexanedicarboxylic acid, or a mixture thereof; and about 10 to 100 mole percent, based on the total moles of diol residues, of the residues of 1,4-cyclohexanedimethanol; ethylene glycol; diethylene glycol; 1,3-cyclohexanedimethanol; 1,4-butanediol; 2,2,4,4-tetramethyl-1,3-cyclobutanediol, or mixtures thereof. In another example, the polyester can comprise about 95 to 100%, based on the total acid residues, of the residues or 1,4-cyclohexanedicarboxylic acid and about 95 to 100 mole %, based on the total diol residues, of the residues of 1,4-cyclohexanedimethanol. In yet another example, the cycloaliphatic polyester can be at least one polyester selected from poly(1,3 cyclohexylenedimethylene-1,3-cyclohexanedicarboxylate), poly(1,4 cyclohexylenedimethylene-1,4-cyclohexanedicarboxylate), and poly(2,2,4,4-tetramethyl-1,3-cyclobutylene-1,4-cyclohexanedicarboxylate).

The polyesters of the instant invention are readily prepared from the appropriate dicarboxylic acids, esters, anhydrides, or salts, and the appropriate diol or diol mixtures using typical polycondensation reaction conditions. Thus, the dicarboxylic acid component of the polyesters of the present invention can be derived from dicarboxylic acids, their corresponding esters, or mixtures thereof. Examples of esters of the dicarboxylic acids useful in the present invention include the dimethyl, dipropyl, diisopropyl, dibutyl, and diphenyl esters, and the like. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The process is operated advantageously as a continuous process for economic reasons and to produce superior coloration of the polymer as the polyester may deteriorate in appearance if allowed to reside in a reactor at an elevated temperature for too long a duration.

The polyesters of the present invention are prepared by procedures known to persons skilled in the art. The reaction of the diol and dicarboxylic acid may be carried out using conventional polyester polymerization conditions or by melt phase processes, but those with sufficient crystallinity may be made by melt phase followed by solid phase polycondensation techniques. For example, when preparing the polyester by means of an ester interchange reaction, i.e., from the ester form of the dicarboxylic acid components, the reaction process may comprise two steps. In the first step, the diol component and the dicarboxylic acid component are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to about 4 hours while the preferred pressure ranges from about 103 kPa gauge (15 psig) to about 276 kPa gauge (40 psig). Thereafter, the reaction product is heated under higher temperatures and under reduced pressure to form the polyester with the elimination of diol, which is readily volatilized under these conditions and removed from the system. This second step, or polycondensation step, is continued under higher vacuum and a temperature which generally ranges from about 230° C. to about 350° C., preferably about 250° C. to about 310° C. and, most preferably, about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reaction rates of both stages are increased by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed.

To ensure that the reaction of the diol component and dicarboxylic acid component by an ester interchange reaction is driven to completion, it is sometimes desirable to employ about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

In the preparation of polyester by direct esterification, i.e., from the acid form of the dicarboxylic acid component, polyesters are produced by reacting the dicarboxylic acid or a mixture of dicarboxylic acids with the diol component or a mixture of diol components. The reaction is conducted at a pressure of from about 7 kPa gauge (1 psig) to about 1379 kPa gauge (200 psig), preferably less than 689 kPa (100 psig) to produce a low molecular weight polyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction.

The aliphatic polyester composition of the invention also can comprise at least one hindered amine light stabilizer, abbreviated herein as "HALS". Many of the HALS of the present invention are known compounds and some are commercially available. The HALS can include their salts, N-oxides and N-hydroxides. In general, the HALS can be described as having an amino nitrogen contained in a carbon-nitrogen-carbon chain which forms part of a non-aromatic heterocyclic ring where each of the two carbon atoms of the chain is bonded to two lower alkyl groups which may be the same or different, each lower alkyl group containing from 1 to 22 carbon atoms, or to an alicyclic group containing from 3 to 8 carbon atoms, which sterically hinder the amine. For example, in one embodiment of the invention, the HALS can comprise 2,2,6,6-tetraalkylpiperidines, their acid addition salts or complexes with metal compounds. Examples of hindered amine light stabilizers which can be used in the instant invention are represented by formulas (1-4):

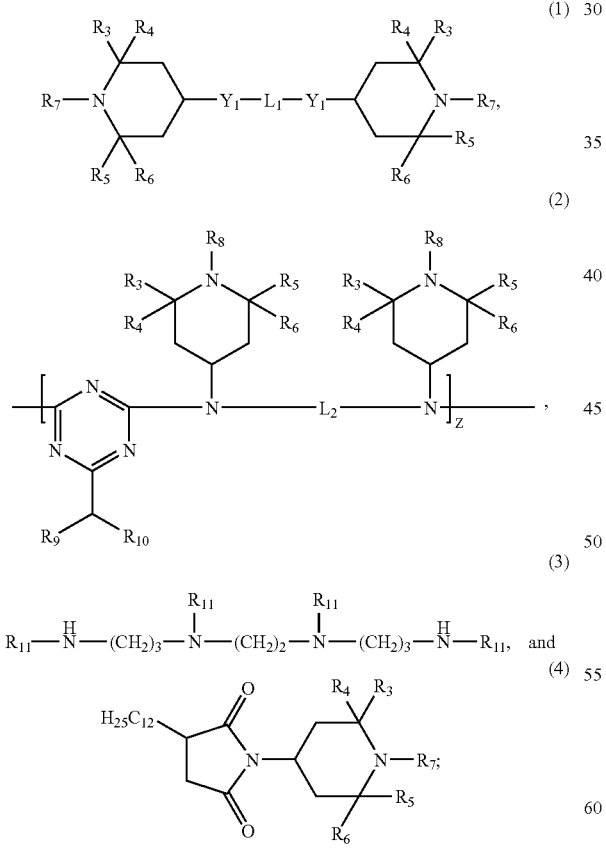

wherein
$R_3$, $R_4$, $R_5$ and $R_6$ are $C_1$-$C_{22}$ alkyl;
$R_7$ and $R_8$ are independently selected from hydrogen, $C_1$-$C_{22}$ alkyl, and $C_1$-$C_{22}$ alkoxy;
$Y_1$ is —O—;
$L_1$ is the divalent linking group —C(O)-$L_2$-C(O)—;
$L_2$ is $C_1$-$C_{22}$ alkylene;
$R_9$ and $R_{10}$ are independently selected from hydrogen, $C_1$-$C_{22}$ alkyl, $C_3$-$C_8$ cycloalkyl, and substituted $C_3$-$C_8$ cycloalkyl, or $R_9$ and $R_{10}$ collectively may represent a divalent group forming a morpholine and/or a piperidine ring;
Z is a positive integer of up to 20;
$R_{11}$ is selected from hydrogen, $C_1$-$C_{22}$ alkyl, substituted $C_1$-$C_{22}$alkyl, and radical A, wherein radical A has the following structure:

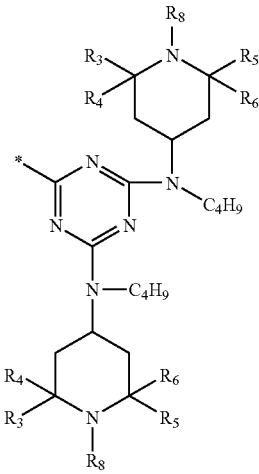

Radical A wherein * designates the position of attachment.

Typically, the polyester composition of the invention will comprise about 0.05 to about 2 weight percent of at least one HALS or, more typically, about 0.1 to about 1 weight percent. Additional examples of HALS are compounds having formula (1), wherein $R_3$, $R_4$, $R_5$, and $R_6$ are methyl; $R_7$ is methyl, $C_8H_{17}O$—, or hydrogen; and $L_2$ is $C_8$ alkylene.

In another embodiment, the HALS may be represented by formula (1) above wherein $R_3$, $R_4$, $R_5$, and $R_6$ are methyl, $R_7$ is hydrogen, and $L_2$ is $C_8$ alkylene. In another example, $R_3$, $R_4$, $R_5$, and $R_6$ are methyl, $R_7$ is an octyloxy radical, $C_8H_{17}O$—, and $L_2$ is $C_8$ alkylene. In yet another example, $R_3$, $R_4$, $R_5$, $R_6$ and $R_7$ are methyl, and $L_2$ is $C_8$ alkylene. Additional examples of HALS are compounds can be represented by formula (2), wherein $R_3$, $R_4$, $R_5$, and $R_6$ are methyl groups; $R_8$ is a methyl group or hydrogen; $(R_9)N(R_{10})$ collectively represents a morpholino group; and $L_2$ is $C_6$ alkylene or, in another example, $R_3$, $R_4$, $R_5$, and $R_6$ are methyl groups; $R_8$ and $R_9$ are hydrogen; $R_{10}$ is 2,4,4-trimethyl-2-pentyl; and $L_2$ is $C_6$ alkylene. In yet another embodiment, the HALS can comprise at least one compound having formula (3), in which $R_{11}$ is radical A; and $R_3$, $R_4$, $R_5$, $R_6$, and $R_8$ each are methyl. In still another example, the HALS can comprise a compound having formula (4), in which $R_3$, $R_4$, $R_5$, and $R_6$ each are methyl and $R_7$ is hydrogen or methyl.

These compounds are known in the art and some are commercially available such as, for example under the trade designations CYASORB™ UV-3529 (Cytec Industries, CAS# 193098-40-7, represented by formula (2) wherein $R_3$, $R_4$, $R_5$, $R_6$, and $R_8$ are methyl, $(R_9)N(R_{10})$ collectively represents a morpholino group, and $L_2$ is $C_6$ alkylene), CYASORB™ UV-3346 (Cytec Industries, CAS# 90751-07-8), represented by formula (2) wherein $R_3$, $R_4$, $R_5$, $R_6$ are methyl and $R_8$ is hydrogen, $(R_9)N(R_{10})$ collectively represents a morpholino group, and $L_2$ is $C_6$ alkylene), TINUVIN™ 770 (Ciba Specialty Chemicals, CAS# 52829-07-9, represented by formula (1) wherein $R_3$, $R_4$, $R_5$, and $R_6$ are methyl, $R_7$ is hydrogen, and $L_2$ is $C_8$ alkylene), TINUVIN™ 123 (Ciba Specialty Chemicals, CAS# 129757-67-1, represented by formula (1) wherein $R_3$, $R_4$, $R_5$, and $R_6$ are methyl, $R_7$ is —$OC_8H_{17}$, and $L_2$ is $C_8$ alkylene), CHIMASSORB™ 119 (Ciba Specialty Chemicals, CAS# 106990-43-6, represented by formula (3), wherein $R_3$, $R_4$, $R_5$, $R_6$, and $R_8$ are methyl, and $R_{11}$ is radical A), LOWILITE 76 (Great Lakes Chemical Corp., CAS# 41556-26-7, represented by formula (1) wherein $R_3$, $R_4$, $R_5$, $R_6$, and $R_7$ are methyl and $L_2$ is $C_8$ alkylene), and CYASORB™ UV-3581 (Cytec Industries, CAS# 193098-40-7, represented by formula (4) wherein $R_3$, $R_4$, $R_5$, and $R_6$ are methyl and $R_7$ is hydrogen). Additional preferred hindered amine light stabilizer may be found in the *Plastic Additives Handbook*, 5th Edition (Hanser Gardner Publications, Inc., Cincinnati, Ohio, USA, 2001).

Tris-aryl-S-triazine UV absorbers have been found to provide low color and haze in the composition of the invention. Thus, in another embodiment of the invention, the aliphatic polyester composition also comprises at least one tris-aryl-S-triazine UV-absorber represented by formula (5):

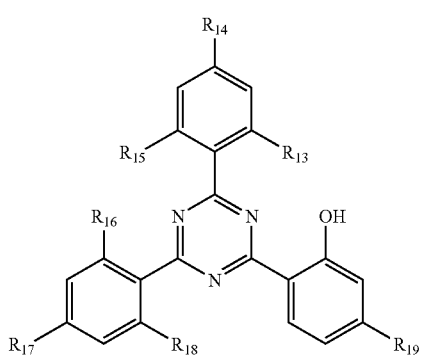

(5)

wherein
$R_{13}$, $R_{14}$, $R_{15}$, $R_{16}$, $R_{17}$, and $R_{18}$ are independently selected from hydrogen, $C_1$-$C_{22}$ alkyl, substituted $C_1$-$C_{22}$ alkyl, $C_3$-$C_8$ cycloalkyl, and substituted $C_3$-$C_8$ cycloalkyl; and
$R_{19}$ is selected from hydrogen, $C_1$-$C_{22}$ alkyl, substituted $C_1$-$C_{22}$ alkyl, $C_3$-$C_8$ cycloalkyl, substituted $C_3$-$C_8$ cycloalkyl and —$OR_{20}$,
wherein
$R_{20}$ is selected from hydrogen, $C_1$-$C_{22}$ alkyl, substituted $C_1$-$C_{22}$ alkyl, $C_3$-$C_8$ cycloalkyl, substituted $C_3$-$C_8$ cycloalkyl, aryl, and heteroaryl.

The term "UV-light absorber" is defined as one compound or a mixture of compounds that absorb light in the range of 290-400 nm with a minimal absorbance between 400 and 700 nm, and that improves the weatherability of the polymer compositions. Preferably, the polyester composition comprises about 0.1 to about 6 weight percent of at least one tris-aryl-S-triazine UV absorber, based on the total weight of the composition. Other ranges of UV absorber are about 0.2 to about 4 weight percent, and about 0.5 to about 2 weight percent. Further examples of UV absorbers are compounds represented by formula (5) above in which $R_{13}$, $R_{14}$, $R_{15}$, $R_{16}$, $R_{17}$, and $R_{18}$ are hydrogen and $R_{19}$ is —$OC_6H_{13}$; and in which $R_{15}$ and $R_{16}$ are hydrogen; $R_{13}$, $R_{14}$, $R_{17}$, and $R_{18}$ are methyl; and $R_{19}$ is —$OC_8H_{17}$. These UV absorbers are known to persons skilled in the art and some are commercially available such as, for example, under the trade designations CYASORB™ UV-1164 (Cytec Industries, CAS# 2725-22-6, formula (5) wherein $R_{15}$ and $R_{16}$, are hydrogen; $R_{13}$, $R_{14}$, $R_{17}$, and $R_{18}$ are methyl and $R_{19}$ is —$OC_8H_{17}$) and TINUVIN™ 1577 (Ciba Specialty Chemicals, CAS# 147315-50-2, formula (5) wherein $R_{13}$, $R_{14}$, $R_{15}$, $R_{16}$, $R_{17}$, and $R_{18}$ are hydrogen and $R_{19}$ is —$OC_6H_{13}$).

In one embodiment, for example, the polyester composition comprises a polyester having about 80 to 100 mole percent, based on the total moles of dicarboxylic acid residues, of the residues of 1,4-cyclohexanedicarboxylic acid; 1,3-cyclohexanedicarboxylic acid, or a mixture thereof; and about 10 to about 100 mole percent, based on the total moles of diol residues, of the residues of 1,4-cyclohexanedimethanol; ethylene glycol; diethylene glycol; 1,3-cyclohexanedimethanol; 1,4-butanediol; 2,2,4,4-tetramethyl-1,3-cyclobutanediol, or mixtures thereof; and the hindered amine light stabilizer comprises a compound having formula (2) in which $R_3$, $R_4$, $R_5$, and $R_6$ are methyl groups; $R_8$ and $R_9$ are hydrogen; $R_{10}$ is 2,4,4-trimethyl-2-pentyl; and $L_2$ is $C_6$ alkylene. The polyester composition also comprises about 0.1 to about 2 weight percent of the tris-aryl-S-triazine UV-absorber represented by formula (5) in which $R_{15}$ and $R_{16}$, are hydrogen; $R_{13}$, $R_{14}$, $R_{17}$, and $R_{18}$ are hydrogen or methyl; and $R_{19}$ is —$OC_6H_{13}$ or —$OC_8H_{17}$. In another example, the polyester may comprise (1,4 cyclohexylenedimethylene-1,4-cyclohexanedicarboxylate), poly(2,2,4,4-tetramethyl-1,3-cyclobutylene-1,4-cyclohexanedicarboxylate), or mixtures thereof.

Our novel aliphatic composition may further comprise a dipentaerythritol diphosphite that, in the presence of certain HALS, avoids the initial haze and color that stabilized compositions can develop prior to weathering. Thus, another aspect of the invention is a stabilized, aliphatic polyester composition, comprising:
(A) at least one aliphatic, thermoplastic polyester comprising residues of at least one substituted or unsubstituted, linear or branched, dicarboxylic acid selected from aliphatic dicarboxylic acids containing 2 to 18 carbon atoms and cycloaliphatic dicarboxylic acids containing 5 to 10 carbon atoms; and residues of at least one, substituted or unsubstituted, linear or branched, diol containing 2 to 18 carbon atoms selected from aliphatic diols, polyalkylene ether glycols, and cycloaliphatic diols;
(B) at least one hindered amine light stabilizer selected from one or more compounds having formulas (1) and (3):

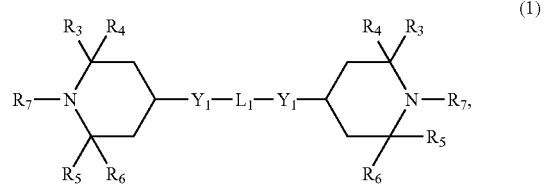

(1)

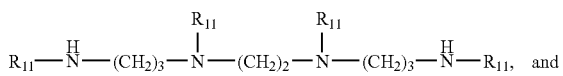

(3)

wherein
$R_3$, $R_4$, $R_5$ and $R_6$ are $C_1$-$C_{22}$ alkyl;
$R_7$ and $R_8$ are independently selected from hydrogen, $C_1$-$C_{22}$ alkyl, and $C_1$-$C_{22}$ alkoxy;

$Y_1$ is —O—;
$L_1$ is the divalent linking group —C(O)-$L_2$-C(O)—;
$L_2$ is $C_1$-$C_{22}$ alkylene; and
$R_{11}$ is selected from hydrogen, $C_1$-$C_{22}$ alkyl, substituted $C_1$-$C_{22}$ alkyl, and radical A, wherein radical A has the following structure:

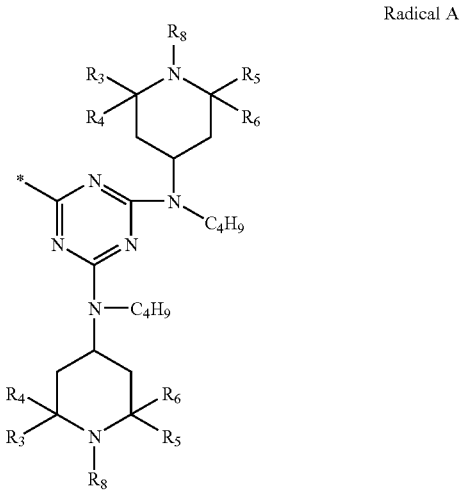

Radical A wherein * designates the position of attachment;
(C) at least one tris-aryl-S-triazine UV-absorber; and
(D) at least one pentaerythritol diphosphite.

Typically, the composition will comprise about 0.1 to about 2 weight percent, based on the total weight of said composition, of the pentaerythritol diphosphite. Other examples of weight percentage ranges for the pentaerythritol diphosphite are about 0.1 to about 1.5 weight percent, and about 0.1 to about 1 weight percent. Typically, the pentaerythritol diphosphite can comprise at least one compound represented by formula (6):

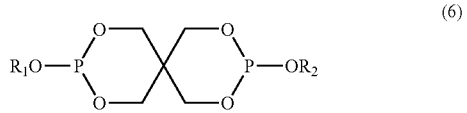

(6)

wherein
$R_1$ and $R_2$ are independently selected from substituted and unsubstituted $C_1$-$C_{22}$ alkyl, $C_3$-$C_8$ cycloalkyl, and aryl.

For example, $R_1$ and $R_2$ each can be isodecyl, octadecyl, or 2,4-di-tert-butylphenyl. In another example, $R_1$ and $R_2$ are each octadecyl. These compounds are known in the art and some are commercially available such as, for example, under the trade designation ALKANOX™ P-24 (Great Lakes Chemicals, CAS No. 26741-53-7, $R_1$ and $R_2$ are each 2,4-di-tert-butylphenyl), DOVERPHOS™ 1220 (Dover Chemical, CAS No. 26544-27-4, $R_1$ and $R_2$ are each isodecyl), WESTON™ 618, and WESTON™ 619 (GE Specialty Chemicals, CAS No's 3806-34-6 and CAS No. 122-20-3, $R_1$ and $R_2$ are each octadecyl).

The various embodiments of the aliphatic polyester, the HALS as represented by formulas (1) and (3), and UV absorber are as described hereinabove. For example, the aliphatic polyester may comprise diacid residues of one or more aliphatic dicarboxylic acids selected from glutaric acid, diglycolic acid, succinic acid, 1,4-cyclohexanedicarboxylic acid, adipic acid, 2,6-decahydronaphthalenedicarboxylic, 1,3-cyclohexanedicarboxylic, and 2,5-norbornanedicarboxylic. In yet another example, the aliphatic polyester may comprise the residues of 1,4-cyclohexanedicarboxylic acid. In another example, the aliphatic polyester may comprise the residues of at least one diol selected from ethylene glycol, diethylene glycol, 1,3-propanediol, 2,2-dimethyl-1,3-propanediol, 1,3-butanediol, 1,4-butanediol, 1,5-pentanediol, 1,6-hexanediol, poly(ethylene glycol), diethylene glycol, 2,2,4-trimethyl-1,6-hexanediol, thiodiethanol, 1,3-cyclohexanedimethanol, 1,4-cyclohexanedimethanol, 2,6-decahydronaphthalenedimethanol, 2,2,4,4-tetramethyl-1,3-cyclobutanediol, triethylene glycol, tetraethylene glycol, poly(propylene glycol), 1,4:3,6-dianhydro-sorbitol, and 4,4'-isopropylidenedicyclohexanol. In yet another example, the aliphatic polyester comprises about 95 to 100 mole percent of the residues of 1,4-cyclohexanedicarboxylic acid; and about 95 to 100 mole percent, based on the total moles of diol residues, of the residues of 1,4-cyclohexanedimethanol. Additonal examples of aliphatic polyesters of the invention include polyesters having diacid residues comprising about 80 to 100 mole percent, based on the total moles of dicarboxylic acid residues, of the residues of 1,4-cyclohexanedicarboxylic acid; 1,3-cyclohexanedicarboxylic acid, or a mixture thereof; and about 10 to 100 mole percent, based on the total moles of diol residues, of the residues of 1,4-cyclohexanedimethanol; ethylene glycol; diethylene glycol; 1,3-cyclohexanedimethanol; 1,4-butanediol; 2,2,4,4-tetramethyl-1,3-cyclobutanediol, or mixtures thereof. In yet another example, the aliphatic polyester may comprise at least one polyester selected from poly(1,3 cyclohexylenedimethylene-1,3-cyclohexanedicarboxylate), poly(1,4 cyclohexylenedimethylene-1,4-cyclohexanedicarboxylate), and poly(2,2,4,4-tetramethyl-1,3-cyclobutylene-1,4-cyclohexanedicarboxylate). In addition to the aliphatic polyester, the HALS and UV absorber are as described hereinabove and can be represented by formulas (1) and (3). For example, the aliphatic polyester composition may comprise about 0.1 to about 1 weight percent of the HALS represented by formulas (1) and (3). Moreover, persons of ordinary skill in the art will understand that the present invention can comprise any combination of the polyesters, the HALS represented by formulas (1) and (3), UV absorbers, and phosphites described above.

The instant invention also provides a stabilized aliphatic polyester composition, comprising:

(A) at least one thermoplastic, aliphatic polyester comprising about 80 to 100 mole percent, based on a total of 100 mole percent dicarboxylic acid residues, of the residues of at least one dicarboxylic acid, selected from 1,4-cyclohexanedicarboxylic acid and 1,3-cyclohexanedicarboxylic acid and about 10 to 100 mole percent, based on a total of 100 mole percent diol residues, of the residues of at least one diol selected from 1,4-cyclohexanedimethanol; ethylene glycol; diethylene glycol; 1,3-cyclohexanedimethanol; 1,4-butanediol; and 2,2,4,4-tetramethyl-1,3-cyclobutanediol;

(B) about 0.1 to about 2 weight percent, based on the total weight of said composition, of at least one hindered amine light stabilizer selected from compounds having formula (1):

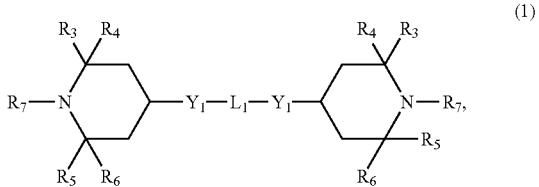

wherein
$R_3$, $R_4$, $R_5$, and $R_6$ are methyl groups;
$R_7$ is methyl, $C_8H_{17}O$—, or hydrogen;
$Y_1$ is —O—;
$L_1$ is the divalent linking group —C(O)-$L_2$-C(O)—; and
$L_2$ is $C_8$ alkylene;
(C) about 0.1 to about 6 weight percent, based on the total weight of said composition, of at least one tris-aryl-S-triazine UV-absorber selected from compounds having formula (5):

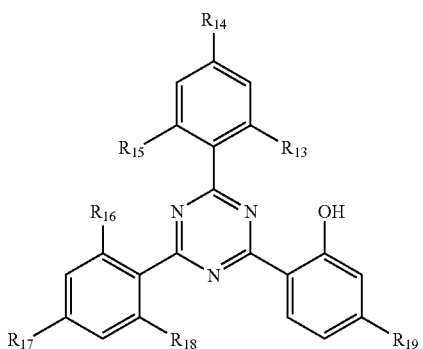

wherein
$R_{15}$ and $R_{16}$, are hydrogen;
$R_{13}$, $R_{14}$, $R_{17}$, and $R_{18}$ are hydrogen or methyl; and
$R_{19}$ is —$OC_6H_{13}$ or —$OC_8H_{17}$; and
(D) about 0.1 to about 2 weight percent, based on the total weight of said composition, of at least one pentaerythritol diphosphite selected from compounds having formula (6):

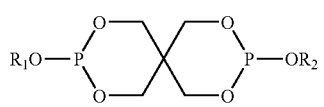

wherein
$R_1$ and $R_2$ are each isodecyl, octadecyl, or 2,4-di-tert-butylphenyl.

Representative examples of aliphatic polyesters include, but are not limited to, poly(1,3 cyclohexylenedimethylene-1,3-cyclohexanedicarboxylate), poly(1,4 cyclohexylenedimethylene-1,4-cyclohexanedicarboxylate), poly(2,2,4,4-tetramethyl-1,3-cyclobutylene-1,4-cyclohexanedicarboxylate) and mixtures of one or more of these polyesters. For example, the aliphatic polyester can comprise poly(1,4 cyclohexylenedimethylene-1,4-cyclohexanedicarboxylate) and the pentaerythritol diphosphite can be represented by structure (6) wherein $R_1$ and $R_2$ are each octadecyl.

For example, in one embodiment of the invention, the phosphite may comprise WESTON™ 619, the UV absorber may comprise TINUVIN™ 1577 or CYASORB™ UV-1164, and the HALS may comprise LOWILITE™ 76. In another example, the aliphatic polyester may comprise poly(1,4 cyclohexylenedimethylene-1,4-cyclohexanedicarboxylate), the phosphite may comprise WESTON™ 618 or WESTON™ 619, the UV absorber may comprise TINUVIN™ 1577 or CYASORB™ UV-1164, and the HALS may comprise TINUVIN™ 770. It is understood that other combinations of aliphatic polyesters, phosphites, UV absorbers, and HALS are possible and included in the scope of the invention.

In addition, the aliphatic polyester compositions may further comprise one or more of the following: antioxidants, melt strength enhancers, branching agents (e.g., glycerol, trimellitic acid and anhydride), chain extenders, flame retardants, fillers, acid scavengers, dyes, colorants, pigments, anti-blocking agents, flow enhancers, impact modifiers, antistatic agents, processing aids, mold release additives, plasticizers, slips, stabilizers, waxes, UV absorbers, optical brighteners, lubricants, pinning additives, foaming agents, antistats, nucleators, glass beads, metal-spheres, ceramic beads, carbon black, crosslinked polystyrene beads, and the like. Colorants, sometimes referred to as toners, may be added to impart a desired neutral hue and/or brightness to the polyester. For example, the polyester compositions may comprise 0 to about 30 weight percent of one or more processing aids and/or fillers to alter the surface properties of the composition and/or to enhance flow. Representative examples of processing aids include calcium carbonate, talc, clay, mica, zeolites, wollastonite, kaolin, diatomaceous earth, $TiO_2$, $NH_4Cl$, silica, calcium oxide, sodium sulfate, and calcium phosphate. Use of titanium dioxide and other pigments or dyes, might be included, for example, to control whiteness of the film, or to make a colored articles. An antistat or other coating may also be applied to the surface of the article.

Further examples of additives include one or more additives selected from an organic or inorganic colorants, hindered phenolic antioxidants, impact modifiers, halogenated flame retardants, nonhalogenated flame retardants, and recycled polymers. The terms "phenolic antioxidants" and "hindered phenol" are primary antioxidants that are known to those skilled in the art and may be represented by the structures listed on pages 98-108 in the Plastic Additives Handbook 5th Edition (Hanser Gardner Publications, Inc., Cincinnati, Ohio, USA, 2001). Preferred examples are CYANOX™ 1741 and CYANOX™ 1790 (Cytec Industries, CAS #'s 27676-62-6 and 40601-76-1), IRGANOX™ 1010 (Ciba Specialty Chemicals, CAS # 6683-19-8 and IRGANOX™ 1330 (Ciba Specialty Chemicals, CAS # 1709-70-2). The term "halogenated flame-retardants" is defined as compounds that can contain one or more of the following: fluorine, chlorine, bromine, and iodine, which act in such away as to decrease the flammability of the polymer composition. More preferred are compounds that contain bromine such as brominated polycarbonate, brominated naphthalene, brominated bisphenol-A, brominated biphenyl, brominated polystyrene, and the like.

The aliphatic polyester compositions set forth above may be used to fabricate shaped articles such as, for example, films, sheets, bottles, tubes, profiles, fibers, and molded articles. Such articles may be produced by any means well known to skilled persons in the art such as, for example by extrusion, calendering, thermoforming, blow-molding, extrusion blow-molding, casting, spinning, drafting, tentering, or blowing. The shaped article can comprise one or more layers such as, for example, a film having at least 2 layers In another example, the aliphatic polyester compositions described hereinabove may be fabricated into films or sheets by any technique known in the art. For example, the aliphatic polyester compositions may be used for heavy-gauge sheet, cap layers for extruded sheet, cap layers for extruded films, thermoformable sheeting products, injection molded products, thin films, thick films, articles made using thin films, articles using from thick films, articles made using heavy gauge sheet and the like. The formation of films can be achieved by melt extrusion, as described, for example, in U.S. Pat. No. 4,880,592, or by compression molding as described, for example, in U.S. Pat. No. 4,427,614, or by any other suitable method. For example, films may be produced by the well known cast film, blown film and extrusion coating techniques, the latter including extrusion onto a substrate. Such a substrate may also include a tie-layer. Films produced by melt casting or blowing can be thermally bonded or sealed to a substrate using an adhesive. The compositions may be fabricated into mono-layer or multi-layer films by any technique known in the art. For example, mono-layer, or multi-layer films may be produced by the well known cast film, blown film and extrusion coating techniques, the latter including extrusion onto a substrate. Preferred substrates include woven and nonwoven fabrics. Mono-layer, or multi-layer films produced by melt casting or blowing can be thermally bonded or sealed to a substrate using an adhesive.

In another example, the shaped article can be a fiber. The fiber may be a staple, monofilament, or multifilament fiber having a shaped cross-section. For the purposes of this invention, the term "fiber" refers to a shaped polymeric body of high aspect ratio capable of being formed into two or three dimensional articles such as woven or nonwoven fabrics. In addition, fiber refers to filaments that may take any of the various forms well known to persons skilled in the art, namely monofilaments, multifilaments, tows, staple or cut fibers, staple yarns, cords, woven, tufted, and knitted fabrics, nonwoven fabrics, including melt blown fabrics and spunbond fabrics, and multilayer nonwovens, laminates, and composites from such fibers. The fibers of the present invention may be a monofilament, multifilament, or bicomponent fiber. Our novel fibers may be produced as a staple, yarn, cord, or a direct spun, nonwoven fabric.

Monofilament fibers generally range in size from about 20 to about 8000 denier per filament (abbreviated herein as "d/f") and are particularly useful in paper machine clothing applications. The preferred fibers will have d/f values in the range of about 500 to about 5000. Such monofilaments may be in the form of unicomponent or bicomponent fibers. Bicomponent fibers may have sheath/core, side by side, or other configurations known to persons skilled in the art. Other multicomponent configurations are also possible. The process of preparing bicomponent fibers also is well known and is described in U.S. Pat. No. 3,589,956. In a bicomponent fiber, the stabilized aliphatic polyester composition will be present in amounts of about 10 to about 90 wt. % and will generally be used in the sheath portion of sheath/core fibers. The other component may be from a wide range of other polymeric materials including but not limited to polyesters such as poly(ethylene terephthalate), poly(butylene terephthalate), poly(triethylene terephthalate), polylactides and the like as well as polyolefins, cellulose esters, and polyamides. Side by side combinations with significant differences in thermal shrinkage can be utilized for the development of a spiral crimp. If crimping is desired, a saw tooth or stuffer box crimp is generally suitable for many applications. If the second polyester is in the core of a sheath/core configuration, such a core optionally may be stabilized.

For multifilament fibers of our invention, the size may range from about 2 micrometers for melt blown webs, about 0.5 to about 50 d/f for staple fibers, and to about 5000 d/f for monofilament fibers. Multifilament fibers may also be used as crimped or uncrimped yarns and tows. Fibers used in melt spun and melt blown web fabric may be produced in microdenier sizes.

Fibers can similarly be used in a wide range of products because of the variety in modulus coupled with dimensional stability. Fibers prepared from the aliphatic polyester compositions of the present invention are expected to have excellent optics which make them good candidates for such applications as light piping and fiber optics since their refractive index is lower than other aromatic polyesters.

Our invention also provides a process for the preparation of a stabilized aliphatic polyester composition, comprising blending (A) at least one aliphatic, thermoplastic polyester comprising residues of at least one substituted or unsubstituted, linear or branched, dicarboxylic acid selected from aliphatic dicarboxylic acids containing 2 to 18 carbon atoms and cycloaliphatic dicarboxylic acids containing 5 to 10 carbon atoms; and residues of at least one, substituted or unsubstituted, linear or branched, diol containing 2 to 18 carbon atoms selected from aliphatic diols, polyalkylene ether glycols, and cycloaliphatic diols;

(B) about 0.1 to about 2 weight percent, based on the total weight of said composition, of at least one hindered amine light stabilizer selected from compounds having formula (1)

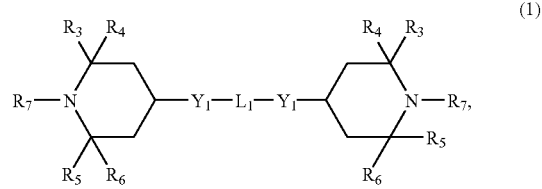

wherein
$R_3$, $R_4$, $R_5$, and $R_6$ are methyl groups;
$R_7$ is methyl, $C_8H_{17}O-$, or hydrogen;
$Y_1$ is $-O-$;
$L_1$ is the divalent linking group $-C(O)-L_2-C(O)-$; and
$L_2$ is $C_8$ alkylene;

(C) about 0.1 to about 6 weight percent, based on the total weight of said composition, of at least one tris-aryl-S-triazine UV-absorber selected from compounds having formula (5):

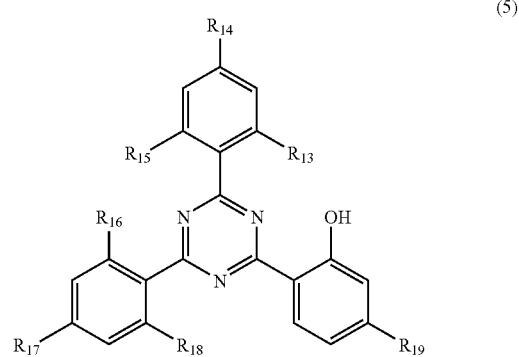

wherein

R$_{15}$ and R$_{16}$, are hydrogen;

R$_{13}$, R$_{14}$, R$_{17}$, and R$_{18}$ are hydrogen or methyl; and

R$_{19}$ is —OC$_6$H$_{13}$ or —OC$_8$H$_{17}$; and (D) about 0.1 to about 2 weight percent, based on the total weight of said composition, of at least one pentaerythritol diphosphite selected from compounds having formula (6):

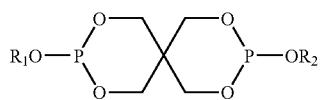

(6)

wherein

R$_1$ and R$_2$ are each isodecyl, octadecyl, or 2,4-di-tert-butylphenyl.

The process may be carried out using any efficient blending means known to persons of ordinary skill in the art. Typical conventional blending techniques include the melt method and the solution-prepared method. Other suitable blending techniques include dry blending and/or extrusion. The components of the aliphatic polyester composition may be compounded in the melt, for example, by using a single screw extruder, twin screw extruder, or Banbury Mixer. They may also be prepared by blending in solution. Additional components such as stabilizers, flame retardants, colorants, lubricants, release agents, impact modifiers, and the like may also be incorporated into the formulation. For example, the polyester composition components may be blended at a temperature of about 25° C. to 350° C. for a time sufficient to form a uniform composition.

The melt blending method includes blending the components at a temperature sufficient to melt the polyester and then cooling the composition to the desired temperature. The term "melt" as used herein includes, but is not limited to, merely softening the aliphatic polyester. For melt mixing methods generally known in the polymers art, see *Mixing and Compounding of Polymers* (I. Manas-Zloczower & Z. Tadmor eds., Carl Hanser Verlag publisher, N.Y. 1994).

The solution-prepared method includes dissolving the appropriate weight/weight ratio of the components and the aliphatic polyester in a suitable organic solvent such as methylene chloride or a 70/30 mixture of methylene chloride and hexafluoroisopropanol, mixing the solution and evaporating the solvent. Solution-prepared blending methods are generally known in the polymers art.

The melt blending method is the preferred method for producing the aliphatic polyester compositions of the present invention. Because no solvents are used, the melt method is more economical and less hazardous than the solution method.

EXAMPLES

General: The invention is further described and illustrated by the following examples. The color and % haze of the polymer films were determined in a conventional manner using a HunterLab ULTRASCAN™ Colorimeter manufactured by Hunter Associates Laboratory, Inc., Reston, Va. The instrument was operated using HunterLab Universal Software (version 3.8). Calibration and operation of the instrument was according to the HunterLab User Manual and is largely directed by the Universal Software. The instrument was operated according to its instructions and used the following testing parameters: D65 Light Source (daylight, 6500° K color temperature), Reflectance Mode, Large Area View, Specular Included, CIE 10° Observer, Outputs are CIE L*, a*, b*. An increase in the positive b* value indicates yellowness, while a decrease in the numerical value of b* indicates a reduction in yellowness. Color measurement and practice are discussed by Anni Berger-Schunn in *Practical Color Measurement*, Wiley, NY pages 39-56 and 91-98 (1994).

All aliphatic polyester compositions were made by extruding an aliphatic polyester comprised of 100 mole percent 1,4-cyclohexanedicarboxylic acid residues and 100 mole percent 1,4-cyclohexanedimethanol residues having an inherent viscosity of about 1.0 as determined at 25° C. using 0.25 gram of polymer per 50 mL of a solvent mixture containing 60 weight percent phenol and 40 weight percent tetrachloroethane. The polyester contained approximately 70 ppmw (parts per million by weight) titanium metal. The aliphatic polyester was dried for approximately 24 hours in a vacuum oven (Model 5851, National Appliance Company, Portland, Oreg.) at 70° C. at 120 Torr pressure with a slight ingress of dry nitrogen.

The following additives were used in the examples: TINUVIN™ 1577, a tris-aryl-S-triazine UV absorber having formula (5) wherein R$_{13}$-R$_{18}$ each are hydrogen and R$_{19}$ is —OC$_6$H$_{13}$; CYASORB™ UV-3638, a non-triazine UV absorber; CYASORB™ UV-3529, a HALS having formula (2) in which R$_3$, R$_4$, R$_5$, R$_6$, and R$_8$ are methyl groups, (R$_9$) N(R$_{10}$) collectively is a morpholino group, and L$_2$ is C$_6$ alkylene; CYASORB™ UV-3581, a HALS having formula (4) in which R$_3$, R$_4$, R$_5$, and R$_6$ are methyl; and R$_7$ is hydrogen; CYASORB™ UV-3346, a HALS having formula (2) in which R$_3$, R$_4$, R$_5$, and R$_6$, are methyl groups, R$_8$ is hydrogen, and (R$_9$)N(R$_{10}$) collectively is morpholino group; TINUVIN™ 770, a HALS represented by formula (1) wherein R$_3$, R$_4$, R$_5$, and R$_6$ are methyl groups, R$_7$ is hydrogen, and L$_2$ is C$_8$ alkylene; CHIMASSORB™ 119, a HALS represented by formula (3), wherein R$_3$, R$_4$, R$_5$, R$_6$, and R$_8$ are methyl, and R$_{11}$, is radical A; LOWILITE 76, a HALS represented by formula (1) wherein R$_3$, R$_4$, R$_5$, R$_6$, and R$_7$ are methyl groups and L$_2$ is C$_8$ alkylene; LOWILITE 94 (also available as CHIMASSORB™ 944), a HALS represented by formula (2) wherein R$_3$, R$_4$, R$_5$, and R$_6$ are methyl groups, R$_8$ and R$_9$ are hydrogen, R$_{10}$ is 2,4,4-trimethyl-2-pentyl; and L$_2$ is C$_6$ alkylene; and WESTON™ 619, a pentaerythritol diphosphite represented by formula (6) wherein R$_1$ and R$_2$ are each octadecyl.

All additives were mixed with the polyester by "bag blending" (shaking the materials together in a bag). The polyester composition was extruded using an 18 mm twin-screw extruder (APV Chemical Machinery Inc., Saginaw, Mich. 48601) equipped with a medium mixing screw. All zone temperatures were set to 275° C. except for Zone 1 which was set at 250° C. The inlet port was cooled by circulating water and the screw speed was set to 200 revolutions per minute (rpm). An ACCU-RATE™ (ACCU-RATE Inc. Whitewater, Wis.) dry material feeder was used to feed the polymers and additives into the extruder at a set addition rate of 3.0. The extruded rods were cooled by passing through a 1.37 meter (4.5 feet) long ice-water bath then chopped using a Berlyn pelletizer (The Berlyn Corp., Worcester, Mass.) set at a speed of 5-8. The first 5 minutes of extrudate was not collected in order to ensure that the extruder had been adequately purged. When multiple concentrations of the same mixture of additives were extruded, the lower concentrations of additives always were extruded first. The extruder was purged with at least 300 g of the polyester blend before the next additive was evaluated. Sample compositions are presented in Table I.

The compounded polymer was injection molded into 2.5"× 0.5"×1/16" impact bars and 3.5"×3.5"×1/8" plaques using a Newbury injection molding machine at 260° C. The impact bars were used to evaluate mechanical properties prior to and upon artificial weathering. The plaques were removed at each interval and used to measure color and haze then returned to the WEATHER-OMETER™.

Injection molded samples were weathered in a Ci65A WEATHER-OMETER™ under ASTM G 155 cycle 1 conditions (irradiance of 0.35 W/m$^2$/nm at 340 nm, 102 minutes light and 18 minutes light with water spray). The lamp was a Xenon Arc and borosilicate inner and outer filters were employed. The black panel temperature was 63° C. and the ambient temperature was 42° C. The relative humidity was 55%.

Two impact bars were removed upon each weathering interval for mechanical property testing. Impact strength was determined by impacting the impact bars according to the ASTM D 256 method for Izod testing except that the test specimen was oriented 90° to the normal Izod method, i.e. the hammer strikes the 0.5 inch wide face of the specimen rather than the edge. In the case of samples exposed in a WEATHER-OMETER™ as described above, the impact strength measurement was carried out with the exposed surface being struck by the hammer. Each impact bar was subjected to four evaluations. The impact energy values quoted herein are an average of eight impacts in ft-lbs/in$^2$.

The aliphatic polyester films were prepared according to the following procedure. The extruded pellet samples were dried for approximately 24 h in a vacuum oven (Model 5851, National Appliance Company, Portland, Oreg.) at 70° C. at 20 mm of Hg with a slight ingress of dry nitrogen. Films (20 mils) were prepared by compression molding using a PHI film press (Model PW-220-X-X1-4, Pasadena Hydraulic Inc., California). A 7"×7"×20 mil thick piece of stainless steel having a 6"×6" center section removed was used as a press mold. Two solid 7"×7"×10 mil stainless steel plates served as a bottom and top for the mold. The PHI film press was preheated to 250-275° C. then one of the 7"×7"×10 mil stainless steel plates was placed on the film press followed by a 7"×7"×5 mil piece of KAPTON™ Film (Active Industries). The 7"×7"×20 mil thick shim was placed on top of the KAPTON Film followed by about 12.5 g of the polymer pellets; placed toward the center of the mold. The hydraulic pump of the film press was used to bring the bottom and top of the press within about 0.5" of touching and maintained at that position for about 90 seconds. The press bottom plate was lowered by releasing the hydraulic pressure and another 7"×7"×5 mil piece of the KAPTON Film was placed on top of the softened polymer, pellets followed by the other 7"×7"×10 mil stainless steel plate. The hydraulic pump of the film press was used to bring the bottom and top of the press together until the pressure gauge began to move. The polymer was allowed to heat on the press for about 45 seconds. The hydraulic pump was used to compress the plates to a pressure of about 20,000 psi. The press plates were held under pressure for about 30 seconds and the bottom plate was lowered by releasing the hydraulic pressure. The mold was gripped with a pair of pliers and submersed into a bucket of ice water for about 25 seconds to cool the polymer and mold. The plates were separated and the KAPTON Film was peeped from the polymer to give a 6"×6"×20 mil (500 micron) thick polymer film.

Unless otherwise indicated, all weight percentages are based on the total weight of the polymer composition. Unless otherwise stated, the, change in CIE b* is calculated by determining the absolute change from the initial value to the value obtained after exposure in the WEATHER-OMETER™.

Examples 1-17

Polyester compositions were prepared according to the general procedure described above. These compositions are listed in Table I below. Compression molded polyester films (20 mil) were prepared from the aliphatic polyester compositions of Examples 1-17 in Table I and analyzed for % Haze after 250 KJ and 2500 KJ of exposure and Δb* color after 2500 KJ of weathering according to the procedures described above. The analysis data is shown in Table II.

TABLE I

| | Stabilized Aliphatic Polyester Compositions | | | |
|---|---|---|---|---|
| Example # | Aliphatic Polyester | TINUVIN 1577 (UV Absorber) | CYASORB UV-3638 (UV Absorber) | CHIMASSORB 944 (HALS) |
| 1 | 500 g | | | |
| 2 | 497.5 g | 2.5 g (0.5 wt %) | | |
| 3 | 495 g | 5 g (1 wt %) | | |
| 4 | 490 g | 10 g (2 wt %) | | |
| 5 | 497.5 g | | 2.5 g (0.5 wt %) | |
| 6 | 495 g | | 5 g (1 wt %) | |
| 7 | 490 g | | 10 g (2 wt %) | |
| 8 | 499.75 g | | | 250 mg (0.05 wt %) |
| 9 | 499.5 g | | | 500 mg (0.1 wt %) |
| 10 | 498.75 g | | | 1.25 g (0.25 wt %) |
| 11 | 497.5 g | | | 2.5 g (0.5 wt %) |
| 12 | 497 g | 2.5 g (0.5 wt %) | | 500 mg (0.1 wt %) |
| 13 | 494.5 g | 5 g (1 wt %) | | 500 mg (0.1 wt %) |
| 14 | 489.5 g | 10 g (2 wt %) | | 500 mg (0.1 wt %) |
| 15 | 495 g | 2.5 g (0.5 wt %) | | 2.5 g (0.5 wt %) |
| 16 | 492.5 g | 5 g (1 wt %) | | 2.5 g (0.5 wt %) |
| 17 | 487.5 g | 10 g (2 wt %) | | 2.5 g (0.5 wt %) |

TABLE II

Weathering Data for Aliphatic Polyester Compositions

| Example # | Δ b* color value after 2500 KJ of weathering | % Haze measured after 250 KJ of Exposure | % Haze measured after 2500 KJ of Exposure |
|---|---|---|---|
| 1 | 3.64 | 2.83 | 37.67 |
| 2 | 3.11 | 1.46 | 13.53 |
| 3 | 1.96 | 1.49 | 7.24 |
| 4 | 1.19 | 1.19 | 3.93 |
| 5 | 21.95 | 2.52 | 8.97 |
| 6 | 27.88 | 2.05 | 17.29 |
| 7 | 34.48 | 6.64 | 28.61 |
| 8 | 3.12 | 1.08 | 11.37 |
| 9 | 2.51 | 1.34 | 7.65 |
| 10 | 2.47 | 1.63 | 3.5 |
| 11 | 1.03 | 1.53 | 2.53 |
| 12 | 1.04 | 2.1 | 4.46 |
| 13 | 0.13 | 1.26 | 2.29 |
| 14 | 0.45 | 2.25 | 2.48 |
| 15 | 0.19 | 1.51 | 2.47 |
| 16 | 0.04 | 1.21 | 2.09 |
| 17 | 0.3 | 1.42 | 2.57 |

The samples containing CYASORB UV-3638, a non triazine UV absorber, exhibited higher yellowing relative to the unstabilized aliphatic polyester (Examples 5-7 vs. Example 1). By contrast samples containing TINUVIN 1577, a triazine UV absorber, showed less haze formation and discoloration at all concentrations (Examples 2-4 vs. Example 1). CHIMASSORB 944, a polymeric hindered amine light stabilizer (HALS), also showed reduced haze formation and discoloration at 0.1 weight percent (wt %) and was more effective at 0.25 wt % and 0.5 wt % (Examples 8-11 vs. Example 1). Combinations of CHIMASSORB 944 and TINUVIN 1577 showed the lowest values of color and haze after artificial weathering (Examples 12-17). A triazine UV absorber in combination with a HALS showed lower haze and color than when used alone at a higher loading. Only samples that contained both the triazine UV absorber and the HALS remained ductile after 2500 KJ of exposure.

Examples 18-49

Films prepared from aliphatic polyester compositions stabilized with CHIMASSORB 944 initially had a milky visual appearance that improved upon weathering. To examine the effect of phosphites on initial color and haze, aliphatic polyester compositions containing the triazine UV absorber, TINUVIN™ 1577, WESTON™ 619 (a pentaerythritol diphosphite), and various HALS as set forth in Table III below were prepared by bag blending a 10 wt % concentrate containing the additives in the aliphatic polyesters with the aliphatic polyester prior to extruding under standard conditions. The stabilized polyester compositions were injection molded into plaques and weathering bars under standard conditions, and then were subjected to weathering in a xenon-arc WEATHER-OMETER™. The compositions and weathering data are presented in Tables III and IV, and impact data is presented in Table V.

TABLE III

Stabilized Aliphatic Polyester Compositions

| Example # | Aliphatic Polyester | UV-Absorber TINUVIN 1577 | HALS CYASORB UV-3529 | Phosphite WESTON 619G |
|---|---|---|---|---|
| 18 | 1000 g | None | None | None |
| 19 | 997.5 g | 2.5 g (0.25 wt %) | None | None |
| 20 | 995 g | 5 g (0.5 wt %) | None | None |
| 21 | 995 g | None | None | 5 g (0.5 wt %) |
| 22 | 990 g | 5 g (0.5 wt %) | None | 5 g (0.5 wt %) |
| 23 | 995 g | None | 5 g (0.5 wt %) | None |
| 24 | 990 g | 5 g (0.5 wt %) | 5 g (0.5 wt %) | None |
| 25 | 985 g | 5 g (0.5 wt %) | 5 g (0.5 wt %) | 5 g (0.5 wt %) |
| 26 | 990 g | None | 5 g (0.5 wt %) | 5 g (0.5 wt %) |
| | | TINUVIN 1577 | TINUVIN 770 | WESTON 619G |
| 27 | 995 g | None | 5 g (0.5 wt %) | None |
| 28 | 990 g | 5 g (0.5 wt %) | 5 g (0.5 wt %) | None |
| 29 | 985 g | 5 g (0.5 wt %) | 5 g (0.5 wt %) | 5 g (0.5 wt %) |
| 30 | 990 g | None | 5 g (0.5 wt %) | 5 g (0.5 wt %) |
| | | TINUVIN 1577 | CYASORB UV-3581 | WESTON 619G |
| 31 | 995 g | None | 5 g (0.5 wt %) | None |
| 32 | 990 g | 5 g (0.5 wt %) | 5 g (0.5 wt %) | None |
| 33 | 985 g | 5 g (0.5 wt %) | 5 g (0.5 wt %) | 5 g (0.5 wt %) |
| | | TINUVIN 1577 | CYASORB UV-3346 | WESTON 619G |
| 34 | 995 g | None | 5 g (0.5 wt %) | None |
| 35 | 990 g | 5 g (0.5 wt %) | 5 g (0.5 wt %) | None |
| 36 | 985 g | 5 g (0.5 wt %) | 5 g (0.5 wt %) | 5 g (0.5 wt %) |
| 37 | 990 g | None | 5 g (0.5 wt %) | 5 g (0.5 wt %) |

TABLE III-continued

Stabilized Aliphatic Polyester Compositions

| | | TINUVIN 1577 | CHIMASSORB 119 | WESTON 619G |
|---|---|---|---|---|
| 38 | 995 g | None | 5 g (0.5 wt %) | None |
| 39 | 990 g | 5 g (0.5 wt %) | 5 g (0.5 wt %) | None |
| 40 | 985 g | 5 g (0.5 wt %) | 5 g (0.5 wt %) | 5 g (0.5 wt %) |
| 41 | 990 g | None | 5 g (0.5 wt %) | 5 g (0.5 wt %) |
| | | TINUVIN 1577 | LOWILITE 94 | WESTON 619G |
| 42 | 995 g | None | 5 g (0.5 wt %) | None |
| 43 | 990 g | 5 g (0.5 wt %) | 5 g (0.5 wt %) | None |
| 44 | 985 g | 5 g (0.5 wt %) | 5 g (0.5 wt %) | 5 g (0.5 wt %) |
| 45 | 990 g | None | 5 g (0.5 wt %) | 5 g (0.5 wt %) |
| | | TINUVIN 1577 | LOWILITE 76 | WESTON 619G |
| 46 | 995 g | None | 5 g (0.5 wt %) | None |
| 47 | 990 g | 5 g (0.5 wt %) | 5 g (0.5 wt %) | None |
| 48 | 985 g | 5 g (0.5 wt %) | 5 g (0.5 wt %) | 5 g (0.5 wt %) |
| 49 | 990 g | None | 5 g (0.5 wt %) | 5 g (0.5 wt %) |

Examples 26, 37, and 45 in Table IV, which contain WESTON 619 and either CYASORB 3529, CYASORB 3346, or LOWILITE 94, initially had a milky appearance and no further testing was performed on these samples. In all examples, the addition of a phosphite improved the initial color of blends comprising a HALS and a triazine (Example 28 vs. 29; Example 32 vs. 33; Example 35 vs. 36; Example 39 vs. 40; Example 43 vs 44; and Example 47 vs. 48). Certain combinations of HALS and phosphite, however, were found to exhibit higher initial levels of haze in comparison to compositions that contain the HALS as illustrated by Example 23 vs. Example 26; Example 34 vs Example 37; and Example 42 vs Example 45. By contrast, Examples 29, 33, 40, and 48, comprising a HALS, phosphite, and triazine, all showed low color and haze both before and after weathering and remained ductile after weathering.

TABLE IV

Color and Haze Weathering Data for Aliphatic Polyester Compositions

| Example # | Initial % Haze Measurement | % Haze Measurement After 3000 KJ of Exposure | Initial CIE b* color | CIE b* Color Measurement After 3000 KJ of Exposure |
|---|---|---|---|---|
| 18 | 1.43 | 3.74 | 2.34 | 3.65 |
| 19 | 0.42 | 2.27 | 7.27 | 7.71 |
| 20 | 0.56 | 2.13 | 10.95 | 9.76 |
| 21 | 0.84 | 5.80 | 0.73 | 2.69 |
| 22 | 2.92 | 5.18 | 1.35 | 2.94 |
| 23 | 1.78 | 3.45 | 6.89 | 8.61 |
| 24 | 1.13 | 2.25 | 3.09 | 6.44 |
| 25 | 3.26 | 4.58 | 8.18 | 7.61 |
| 26 | 2.73 | Very hazy (visual) | 3.66 | Not Measured |
| 27 | 0.88 | 2.07 | 3.79 | 5.98 |
| 28 | 1.17 | 2.09 | 10.02 | 8.0 |
| 29 | 1.03 | 1.8 | 7.5 | 6.45 |
| 30 | 1.16 | 1.97 | 2.01 | 5.74 |
| 31 | 0.93 | 2.4 | 3.69 | 6.77 |
| 32 | 1.16 | 1.59 | 10.43 | 8.46 |
| 33 | 2.48 | 3.68 | 6.67 | 6.14 |
| 34 | 0.78 | 2.31 | 3.5 | 6.62 |
| 35 | 1.13 | 1.47 | 10.54 | 8.11 |
| 36 | 8.01 | Very hazy (visual) | 8.91 | Not measured |
| 37 | 2.26 | Very hazy (visual) | 2.58 | Not measured |
| 38 | 0.68 | 1.39 | 3.1 | 6.72 |
| 39 | 1.16 | 1.85 | 9.46 | 8.38 |
| 40 | 1.69 | 2.64 | 5.91 | 5.45 |
| 41 | 3.81 | 3.80 | 4.0 | 5.61 |
| 42 | 2.60 | 3.78 | 5.81 | 8.17 |
| 43 | 1.83 | 2.55 | 12.26 | 9.85 |
| 44 | 10.89 | Very hazy (visual) | 9.29 | Not measured |
| 45 | 9.32 | Very hazy (visual) | 4.12 | Not measured |
| 46 | 0.73 | 1.66 | 3.87 | 6.63 |
| 47 | 1.13 | 1.92 | 10.81 | 8.39 |
| 48 | 1.71 | 2.44 | 8.17 | 6.8 |
| 49 | 1.86 | 2.10 | 2.44 | 5.74 |

TABLE V

Impact Weathering Data for Aliphatic Polyester Compositions

| Example # | Initial Impact Strength (ft-lbs/in$^2$) | Impact After 3000 KJ (ft-lbs/in$^2$) |
|---|---|---|
| 18 | 12.6 | 0.46 |
| 19 | 12.6 | 0.44 |
| 20 | 12.9 | 0.55 |
| 21 | 13.0 | 0.22 |
| 22 | 13.1 | 0.28 |
| 23 | 12.8 | 11.5 |
| 24 | 13.1 | 13.2 |
| 25 | 12.9 | 12.6 |
| 27 | 12.8 | 13.1 |
| 28 | 13.0 | 13.4 |
| 29 | 12.8 | 13.1 |
| 30 | 12.9 | 12.8 |
| 31 | 12.6 | 13.2 |
| 32 | 12.7 | 13.1 |
| 33 | 12.7 | 13.3 |
| 34 | 12.7 | 11.9 |
| 35 | 13.0 | 13.1 |
| 38 | 12.6 | 13.4 |
| 39 | 12.5 | 12.9 |

TABLE V-continued

Impact Weathering Data for Aliphatic Polyester Compositions

| Example # | Initial Impact Strength (ft-lbs/in$^2$) | Impact After 3000 KJ (ft-lbs/in$^2$) |
|---|---|---|
| 40 | 13.2 | 12.4 |
| 41 | 12.9 | 11.7 |
| 42 | 12.6 | 10.1 |
| 43 | 12.6 | 13.3 |
| 46 | 12.4 | 11.7 |
| 47 | 12.6 | 13.3 |
| 48 | 12.7 | 13.8 |
| 49 | 12.6 | 13.5 |

Examples 18, 19, and 23, which contained either a HALS or a triazine, became brittle and lost impact strength upon artificial weathering. All Examples that contained a HALS and a triazine retained impact strength upon artificial weathering.

We claim:

1. A stabilized, aliphatic polyester composition, comprising:

(A) at least one aliphatic, thermoplastic polyester comprising residues of at least one substituted or unsubstituted, linear or branched, dicarboxylic acid selected from aliphatic dicarboxylic acids containing 2 to 18 carbon atoms and cycloaliphatic dicarboxylic acids containing 5 to 10 carbon atoms; and residues of at least one, substituted or unsubstituted, linear or branched, diol containing 2 to 18 carbon atoms selected from aliphatic diols, polyalkylene ether glycols, and cycloaliphatic diols;

(B) at least one hindered amine light stabilizer selected from one or more compounds having formulas (1) and (3):

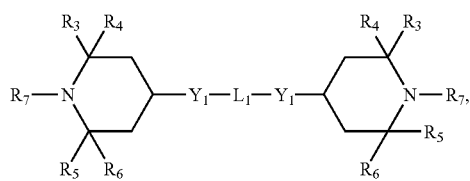

(1)

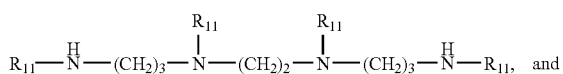

(3)

wherein $R_3$, $R_4$, $R_5$, and $R_6$ are $C_1$-$C_{22}$ alkyl;

$R_7$ and $R_8$ are independently selected from hydrogen, $C_1$-$C_{22}$ alkyl, and $C_1$-$C_{22}$ alkoxy;

$Y_1$ is —O—;

$L_1$ is the divalent linking group —C(O)-$L_2$-C(O)—;

$L_2$ is $C_1$-$C_{22}$ alkylene; and $R_{11}$ is selected from hydrogen, $C_1$-$C_{22}$ alkyl, substituted $C_1$-$C_{22}$ alkyl, and radical A, wherein radical A has the following structure:

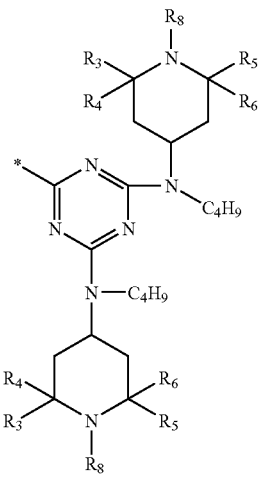

Radical A wherein * designates the position of attachment;

(C) at least one tris-aryl-S-triazine UV-absorber; and (D) at least one pentaerythritol diphosphite, wherein the ratio, on a weight/weight basis, of the at least one hindered light amine stabilizer to the at least on one tris-aryl-S-triazine UV absorber ranges from about 2:1 to about 0.2:1.

2. The polyester composition according to claim 1 which comprises about 0.1 to about 2 weight percent, based on the total weight of said composition, of said pentaerythritol diphosphite, wherein said pentaerythritol diphosphite comprises at least one compound having formula (6):

(6)

wherein $R_1$ and $R_2$ are independently selected from substituted and unsubstituted $C_1$-$C_{22}$ alkyl, $C_3$-$C_8$ cycloalkyl, and, aryl.

3. The polyester composition according to claim 2 wherein $R_1$ and $R_2$ are each isodecyl, octadecyl, or 2,4-di-tert-butylphenyl.

4. The polyester composition according to claim 3 wherein $R_1$ and $R_2$ are each octadecyl.

5. The polyester composition according to claim 2 where said dicarboxylic acid comprises at least one dicarboxylic acid selected from glutaric acid, diglycolic acid, succinic acid, 1,4-cyclohexanedicarboxylic acid, adipic acid, 2,6-decahydronaphthalenedicarboxylic, 1,4-cyclohexanedicarboxylic, 1,3-cyclohexanedicarboxylic, and 2,5-norbornanedicarboxylic.

6. The polyester composition according to claim 5 wherein said dicarboxylic acid comprises 1,4-cyclohexanedicarboxylic acid.

7. The polyester composition according to claim 2 wherein said diol comprises at least one diol selected from ethylene glycol, diethylene glycol, 1,3-propanediol, 2,2-dimethyl-1,3-propanediol, 1,3-butanediol, 1,4-butanediol, 1,5-pentanediol, 1,6-hexanediol, poly(ethylene glycol), diethylene glycol, 2,2,4-trimethyl-1,6-hexanediol, thiodiethanol, 1,3-cyclohexanedimethanol, 1,4-cyclohexanedimethanol, 2,6- decahydronaphthalenedimethanol, 2,2,4,4-tetramethyl-1,3-cyclobutanediol, triethylene glycol, tetraethylene glycol, poly(propylene glycol), 1,4:3,6-dianhydro-sorbitol, and 4,4'-isopropylidene-dicyclohexanol.

8. The polyester composition according to claim 7 wherein said diol comprises at least one diol selected from 1,4-butanediol; 1,3-propanediol; ethylene glycol; 1,6-hexanediol; diethylene glycol; 1,3-cyclohexanedimethanol; 1,4-cyclohexanedimethanol; 2,6-decahydronaphthalenedimethanol; and 2,2,4,4-tetramethyl-1,3-cyclobutanediol.

9. The polyester composition according to claim 2 wherein said polyester comprises about 80 to 100 mole percent, based on the total moles of dicarboxylic acid residues, of the residues of 1,4-cyclohexanedicarboxylic acid; 1,3-cyclohexanedicarboxylic acid, or a mixture thereof; and about 10 to 100 mole percent, based on the total moles of diol residues, of the residues of 1,4-cyclohexanedimethanol; ethylene glycol; diethylene glycol; 1,3-cyclohexanedimethanol; 1,4-butanediol; 2,2,4,4-tetramethyl-1,3-cyclobutanediol, or mixtures thereof.

10. The polyester composition according to claim 9 wherein said aliphatic polyester comprises about 95 to 100 mole percent, based on the total moles of dicarboxylic acid residues, of the residues of 1,4-cyclohexanedicarboxylic acid; and about 95 to 100 mole percent, based on the total moles of diol residues, of the residues of 1,4-cyclohexanedimethanol.

11. The polyester composition according to claim 9 wherein said aliphatic polyester comprises at least one polyester selected from poly(1,3 cyclohexylenedimethylene-1,3-cyclohexanedicarboxylate), poly(1,4 cyclohexylenedimethylene-1,4-cyclohexanedicarboxylate), and poly(2,2,4,4-tetramethyl-1,3-cyclobutylene-1,4-cyclohexanedicarboxylate).

12. The polyester composition according to claim 1 which comprises about 0.1 to about 1 weight percent of said hindered amine light stabilizer, based on the total weight of said composition.

13. The polyester composition according to claim 1 wherein said hindered amine light stabilizer comprises a compound having formula (3),
wherein
$R_{11}$ is radical A; and
$R_3$, $R_4$, $R_5$, $R_6$, and $R_8$ are methyl.

14. The polyester composition according to claim 1 which comprises about 0.1 to about 6 weight percent, based on the total weight of said composition, of said tris-aryl-S-triazine UV-absorber, wherein said tris-aryl-S-triazine UV-absorber comprises at least one compound having formula (5):

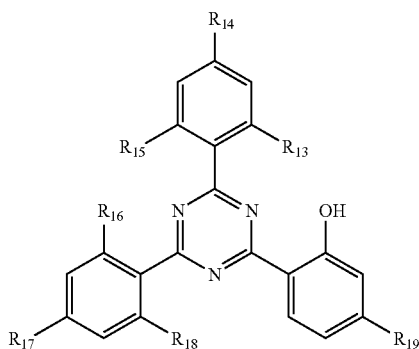

(5)

wherein
$R_{13}$, $R_{14}$, $R_{15}$, $R_{16}$, $R_{17}$, and $R_{18}$ are independently selected from hydrogen, $C_1$-$C_{22}$ alkyl, substituted $C_1$-$C_{22}$ alkyl, $C_3$-$C_8$ cycloalkyl, and substituted $C_3$-$C_8$ cycloalkyl; and
$R_{19}$ is selected from hydrogen, $C_1$-$C_{22}$ alkyl, substituted $C_1$-$C_{22}$ alkyl, $C_3$-$C_8$ cycloalkyl, and substituted $C_3$-$C_8$ cycloalkyl and —$OR_{20}$,
wherein
$R_{20}$ is selected from hydrogen, $C_1$-$C_{22}$ alkyl, substituted $C_1$-$C_{22}$ alkyl, $C_3$-$C_8$ cycloalkyl, and substituted $C_3$-$C_8$ cycloalkyl, aryl, and heteroaryl.

15. A stabilized, aliphatic polyester composition, comprising:
(A) at least one thermoplastic, aliphatic polyester comprising about 80 to 100 mole percent, based on a total of 100 mole percent dicarboxylic acid residues, of the residues of at least one dicarboxylic acid selected from 1,4-cyclohexanedicarboxylic acid and 1,3-cyclohexanedicarboxylic acid and about 10 to 100 mole percent, based on a total of 100 mole percent diol residues, of the residues of at least one diol selected from 1,4-cyclohexanedimethanol; ethylene glycol; diethylene glycol; 1,3-cyclohexanedimethanol; 1,4-butanediol; and 2,2,4,4-tetramethyl-1,3-cyclobutanediol;

(B) about 0.1 to about 2 weight percent, based on the total weight of said composition, of at least one hindered amine light stabilizer selected from compounds having formula (1)

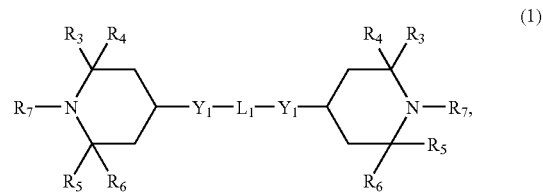

wherein
$R_3$, $R_4$, $R_5$, and $R_6$ are methyl groups;
$R_7$ is methyl, $C_8H_{17}O$—, or hydrogen;
$Y_1$ is —O—;
$L_1$ is the divalent linking group —C(O)-$L_2$-C(O)—; and
$L_2$ is $C_8$ alkylene;

(C) about 0.1 to about 6 weight percent, based on the total weight of said composition, of at least one tris-aryl-S-triazine UV-absorber selected from compounds having formula (5):

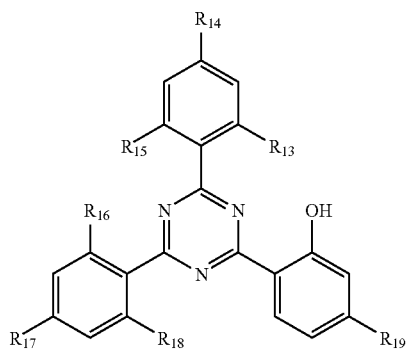 (5)

wherein
$R_{15}$ and $R_{16}$, are hydrogen;
$R_{13}$, $R_{14}$, $R_{17}$, and $R_{18}$ are hydrogen or methyl; and
$R_{19}$ is —$OC_6H_{13}$ or —$OC_8H_{17}$; and (D) about 0.1 to about 2 weight percent, based on the total weight of said composition, of at least one pentaerythritol diphosphite selected from compounds having formula (6):

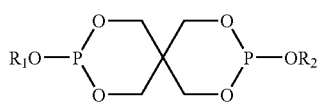 (6)

wherein
$R_1$ and $R_2$ are each isodecyl, octadecyl, or 2,4-di-tert-butylphenyl, and
wherein the ratio, on a weight/weight basis, of the at least one hindered light amine stabilizer to the at least one tris-aryl-S-triazine UV absorber ranges from about 2:1 to about 0.2:1.

* * * * *